(12) United States Patent
Gautier (10) Patent No.: US 11,760,469 B2
(45) Date of Patent: Sep. 19, 2023

(54) ROTATING BLADE AERODYNE PROPULSION DEVICE WITH VERTICAL TAKE-OFF AND LANDING, AND AERODYNE COMPRISING AT LEAST ONE SUCH PROPULSION DEVICE

(71) Applicant: NEXTER SYSTEMS, Roanne (FR)

(72) Inventor: Pierre Gautier, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 125 days.

(21) Appl. No.: 17/603,901

(22) PCT Filed: Apr. 14, 2020

(86) PCT No.: PCT/IB2020/053493
§ 371 (c)(1),
(2) Date: Oct. 14, 2021

(87) PCT Pub. No.: WO2020/212836
PCT Pub. Date: Oct. 22, 2020

(65) Prior Publication Data
US 2022/0194568 A1    Jun. 23, 2022

(30) Foreign Application Priority Data

Apr. 18, 2019   (FR) .................................... 1904060

(51) Int. Cl.
*B64C 27/52*   (2006.01)
*B64C 27/10*   (2023.01)
(Continued)

(52) U.S. Cl.
CPC .............. *B64C 27/10* (2013.01); *B64C 27/12* (2013.01); *B64C 27/52* (2013.01);
(Continued)

(58) Field of Classification Search
CPC ......... B64C 27/10; B64C 27/12; B64C 27/52; B64C 29/0033; B64U 10/10; B64U 30/20
See application file for complete search history.

(56) References Cited

U.S. PATENT DOCUMENTS 2,256,918 A  *  9/1941  Young .................... B64C 27/28
                                                          416/115
7,789,341 B2     9/2010  Arlton et al.
2006/0011777 A1* 1/2006  Arlton ................... B64C 39/024
                                                          244/7 B

FOREIGN PATENT DOCUMENTS

CN     106 915 457 A    7/2017
CN     207 328 827 U    5/2018
(Continued)

OTHER PUBLICATIONS

Jun. 23, 2020 International Search Report issued in International Patent Application No. PCT/IB2020/053493.
(Continued)

*Primary Examiner* — Tye William Abell
(74) *Attorney, Agent, or Firm* — Oliff PLC (57) ABSTRACT

A propulsion device for a rotating blade aerodyne with vertical take-off and landing, comprising a hollow chassis and contra-rotating coaxial rotors with fixed-pitch blades. The means for driving the rotation of each rotor comprise motor means and, for each rotor, a rotating part capable of turning about a yaw axis, located in the central opening of the respective rotor and connected to the latter via a ball joint with finger, the centre of which is the intersection of the prospective rotor disc and the yaw axis and for which the prohibited rotation is that about the axis of rotation of the rotor. Means for controlling the inclination of the rotors about the roll and pitch axes. Aerodyne equipped with the propulsion device.

19 Claims, 10 Drawing Sheets

(51) Int. Cl.
*B64C 27/12* (2006.01)
*B64C 29/00* (2006.01)
*B64U 10/10* (2023.01)
*B64U 30/20* (2023.01)

(52) U.S. Cl.
CPC .......... *B64C 29/0033* (2013.01); *B64U 10/10* (2023.01); *B64U 30/20* (2023.01)

(56) References Cited

FOREIGN PATENT DOCUMENTS

| | | | |
|---|---|---|---|
| FR | 1 202 127 A | 1/1960 | |
| FR | 2980117 B1 | 6/2014 | |
| GB | 2 491 129 A | 11/2012 | |
| WO | 2006/076743 A1 | 7/2006 | |
| WO | 2010/118643 A1 | 10/2010 | |

OTHER PUBLICATIONS

Jun. 23, 2020 Written Opinion issued in International Patent Application No. PCT/IB2020/053493.
Jan. 7, 2020 Search Report and Written Opinion issued in French Patent Application No. 1904060.

* cited by examiner

ROTATING BLADE AERODYNE PROPULSION DEVICE WITH VERTICAL TAKE-OFF AND LANDING, AND AERODYNE COMPRISING AT LEAST ONE SUCH PROPULSION DEVICE

The present invention relates to the technical field of vertical take-off and landing rotary-wing aerodynes, and more specifically to the category of aerodynes propelled by coaxial contra-rotating rotors. In particular, the present invention relates to a coaxial contra-rotating rotor propulsion device and an aerodyne comprising at least one such propulsion device.

The aerodyne according to the present invention can be manned (helicopter) or unmanned (drone).

In this application, the term "propulsion" includes aerodyne lift, translational flight propulsion in the vertical, longitudinal and lateral directions, and yaw, roll and pitch attitude control.

A propulsion device for coaxial contra-rotating rotor aerodyne was proposed in patent FR2980117 B1, comprising a single contra-rotating motor having two coaxial output shafts to each of which is secured a rotor which consists of a set of fixed pitch blades. Contra-rotation of the rotors provides lift, and vertical translation movement and yaw control are achieved by varying the rotational speed of the two rotors, respectively collectively and relative to each other. In order to steer the aerodyne in longitudinal and lateral translation, simultaneously or not, it is proposed to secure the contra-rotating motor on a steering module which is carried by the frame so as to be able to pivot about the roll and pitch axes under the action of control means. Thus, the movement of the aerodyne in the horizontal plane is obtained by rotation about the roll axis and/or the pitch axis of the whole propulsion device, composed of the steering module, the contra-rotating motor and the two rotors.

One of the advantages of this aerodyne is that it is simpler in structure because it does not use the collective and cyclic systems, with swashplates and pushrods, which are conventionally used to vary the pitch of the blades which are articulated to the hub of each rotor, the collective variation of the pitch of the blades making it possible to control the vertical translation movement whereas the asymmetrical cyclic variation of the pitch of the blades makes it possible to control the roll and pitch attitude of the aerodyne, and thus the movement in the horizontal plane. Patent U.S. Pat. No. 2,256,918 A describes an example of such a propulsion device with variable pitch blades and collective and cyclic systems of complex structure.

However, there is a concern that the aerodyne may not be responsive to commands to move in the horizontal plane. Indeed, as the whole propulsion device rotates about the horizontal roll and pitch axes, which are located below the propulsion device, the mass that has to be set in motion is large, which means an increased inertia of the propulsion device that is detrimental to its responsiveness.

Furthermore, in the case of an application to a drone, where the mass of the propulsion device will represent a significant part of the total mass of the aerodyne, instability in flight may also be feared. Indeed, as the centre of rotation of the propulsion device is not located at its centre of gravity but at the lower part, at the level of the orientation module, the centre of gravity will be constantly displaced due to the incessant rolling and pitching movements during the flight.

The manoeuvrability of the aerodyne according to patent FR2980117 B1 is therefore likely to be insufficient in practice, due to a lack of responsiveness and in some cases also due to a lack of stability.

The present invention is intended to provide a coaxial contra-rotating rotor aerodyne propulsion device with improved manoeuvrability, whilst retaining the advantage of simplicity provided by the absence of collective and cyclic blade pitch variation systems.

The solution according to the present invention lies in mounting each rotor on a frame in such a way that only the rotors are moved around the yaw, roll and pitch axes, and not the whole propulsion device. This is achieved by the use of a pin spherical joint connection, which is hollow, to connect each rotor to a rotary part which is located within the frame, which is hollow to this effect, and which pin spherical joint connection rotates the rotor from within the frame, the pin spherical joint connection making it possible to rotate only the rotor about the roll and pitch axes while the rest of the propulsion device remains stationary relative to these axes.

The present invention thus relates to a propulsion device for vertical take-off and landing rotary-wing aerodyne, by means of coaxial contra-rotating rotors that can move in yaw, roll and pitch, the propulsion device including:
- a hollow frame having a longitudinal axis which, in use, is coaxial with the yaw axis,
- an upper rotor and a lower rotor each having an annular central portion to the periphery of which fixed pitch blades are secured or intended to be secured, the rotors being spaced apart one above the other along the yaw axis, each rotor defining a rotor disc and being adapted to be driven in rotation about an axis of rotation that is perpendicular to the rotor disc and to be tilted about the roll axis and the pitch axis,
- drive means for rotating each rotor about its axis of rotation, and
- tilt control means for tilting the rotors about the roll axis and the pitch axis, the propulsion device being characterized in that the drive means includes motor means and, for each rotor, a rotary part which is adapted to be driven in rotation about the yaw axis by the motor means, each rotary part being located in the central opening of the respective rotor and being connected to the latter by a pin spherical joint connection, the centre of which is the intersection of the respective rotor disc and the yaw axis and the axis of which is the axis of rotation of the rotor.

The expression "axis of the pin spherical joint connection" means the axis about which relative rotation between the rotor and the rotary part is prevented.

In a particular embodiment, the rotary parts are each formed by a drive ring rotatably mounted on a circular bearing surface of the frame in which is provided at least one window through which extends a drive member adapted to be driven in rotation by the motor means and adapted to drive the drive ring in rotation.

According to a particular embodiment, each rotor is in spherical contact with the respective drive ring, the centre of the contact sphere being the intersection of the yaw axis and the rotor disc of the rotor, and there being provided a groove which opens on the inner surface of the central part of the rotor and has a length parallel to the yaw axis, in which groove a radial pin secured to the drive ring is engaged so as to transmit to the rotor the rotational movement of the drive ring about the yaw axis while allowing rotations of the rotor about the roll axis and the pitch axis.

According to a particular embodiment, each drive ring is provided, on its inner surface, with a circumferential toothing and the respective drive member is a first gearwheel in mesh with the toothing.

A non-contact drive, for example by a magnetic drive device, would also be possible.

According to a particular embodiment, the motor means includes, for each rotor, a motor dedicated to said rotor and having an output shaft parallel to the yaw axis and whose rotational movement is transmitted to the drive member, optionally by means of a second gearwheel mounted on the output shaft and in mesh with the first gearwheel.

According to a particular embodiment, the motor means for both rotors is located inside the frame, between the rotary parts, preferably the motor means including two dedicated motors aligned with each other, the output shaft of one motor being located on the upper rotor side while the output shaft of the other motor being located on the lower rotor side, both motors extending along an inner wall of the side envelope of the frame.

With such a configuration of the motor means between the two rotary parts, which is possible due to the use of a hollow frame, the propulsion device is much more compact than that of patent FR2980117 B1, since no height is added to that resulting from the distance between the rotors. The use of hollow drive rings, in particular of the same diameter as the frame, further increases the compactness of the propulsion device since part of the motor means, and possibly of the tilt control means as will be discussed below, can be placed at the same height as the rotors.

Furthermore, it is then possible to increase the size of the blades without necessarily increasing the size of the propulsion device, or at least by increasing it significantly less in comparison to patent FR2980117 B1.

This compactness of the propulsion device is particularly advantageous in the case of a drone, and specifically for a use requiring stealth, both visual and acoustic, and in particular a military use.

Alternatively, the motor means may include at least one motor located outside the frame and adapted to produce an output motion, and means for transmitting the output motion of the motor(s) to the rotary parts to drive them in rotation, at least part of said transmission means being located inside the frame.

Such a configuration with the motor means partly outside the frame of the propulsion device, again made possible by the hollow frame and driving the rotors from the inside, could generally be contemplated for a manned aerodyne, requiring a higher motor power. Any known type of motorization could be used, as long as it allows to produce rotational movements in opposite direction for the two rotors, these rotational movements being transmitted to the rotary parts of the rotational drive means, by transmission means extending in the frame which are per se within the reach of the person skilled in the art, such as transmission shafts, etc.

According to a particular embodiment, the tilt control means includes at least two control rods, of fixed length, located outside the frame, between the rotors, and movable in translation parallel to the yaw axis, in both directions, so that each is able to push with one end thereof against one of the rotors and thus to rotate it about an axis, the control rods being angularly spaced from each other so that said axes are different, the tilt control means further including motor means for translating each of the rods.

Such tilt control means contributes to the compactness of the propulsion device, since the control rods do not require an increase in the distance between the rotors, which is the case for systems with swashplate and pushrods.

In a particular embodiment, the motor means includes, for each control rod, a dedicated bidirectional motor whose output shaft rotates a screw parallel to the yaw axis and on which is mounted a rotationally locked nut, so that rotation of the screw moves the nut along the screw, the nut carrying an arm which extends out of the frame, through a slot parallel to the yaw axis, and to which the control rod is secured, the motors preferably being stepper motors.

According to a particular embodiment, for each control rod there is provided a so-called mirror rod of fixed length, located outside the frame, between the rotors, which is parallel to and diametrically opposite the respective control rod and movable in translation parallel to the yaw axis in both directions, and each of the two ends of every mirror rod is in contact with a respective rotor.

In a particular embodiment, the propulsion device includes two control rods, at least the two ends of each of the control rods being in spherical contact with a sliding plate which is provided on the central part of the side of each rotor facing the other rotor, the sliding plate being mounted in a manner allowing relative rotation between the sliding plate and the rotor about the axis of rotation of the rotor, blocking means being provided to prevent rotation of the sliding plate relative to the rods.

The blocking means may include magnets, carried by the rods or by the sliding plate, which magnets cooperate with a ferromagnetic material respectively carried by or forming the sliding plate or the rods, such that rotation of the sliding plate about the axis of rotation is prevented by the attractive force between the control rods and the sliding plate resulting from the cooperation of said magnets and said ferromagnetic parts.

According to another embodiment, the blocking means includes at least one link secured to the frame by a first end at a pivot connection and secured to a sliding plate by a second end at a spherical joint connection, the ends of the link being connected by a sliding rod, the link thus accompanying the movements of the sliding plate while preventing its rotation.

The sliding plate may be connected to the central part of the rotor by a rolling bearing.

According to a particular embodiment, the propulsion device also includes spring-loaded wear take-up rods located outside the frame, between the rotors, and movable in both directions parallel to the yaw axis, and each of two ends of every wear take-up rod is in contact with the sliding plate by resilient bias, the control rods and the wear take-up rods, and if applicable the mirror rods, being regularly distributed around the frame and all at the same distance from the yaw axis.

According to a particular embodiment, all motor means are located between the rotary parts, and preferably the motors dedicated to tilt control are aligned with each other and arranged laterally to the motors dedicated to driving the rotary parts, wherein the output shaft of one motor dedicated to tilt control is located on the upper rotor side and the output shaft of the other motor is located on the lower rotor side, the screws extending next to the plurality of motors and along the inner wall of the side envelope of the frame.

With such a configuration, which is particularly advantageous for an unmanned aerodyne, the compactness of the propulsion device is maximal, as all the means for rotating the rotors and the tilt control means are housed in a space delimited in height by the two rotors.

In addition, only the plurality of rods is outside the frame, so the other components are protected by the frame, making the propulsion device inherently hermetic. This further increases the reliability of the propulsion device, which is already high due to the use of mechanisms with motors, gears and screw and nut mechanisms, which are much more reliable than the use of connecting rods.

The present invention also relates to vertical take-off and landing rotary-wing aerodyne, the propulsion of which is provided by a propulsion device, characterized in that the propulsion device is as defined above.

As mentioned above, the aerodyne may be manned (helicopter) or unmanned (drone).

To better illustrate the subject-matter of the present invention, a particular embodiment is described below, with reference to the attached drawings. In these drawings.

Figure 1:
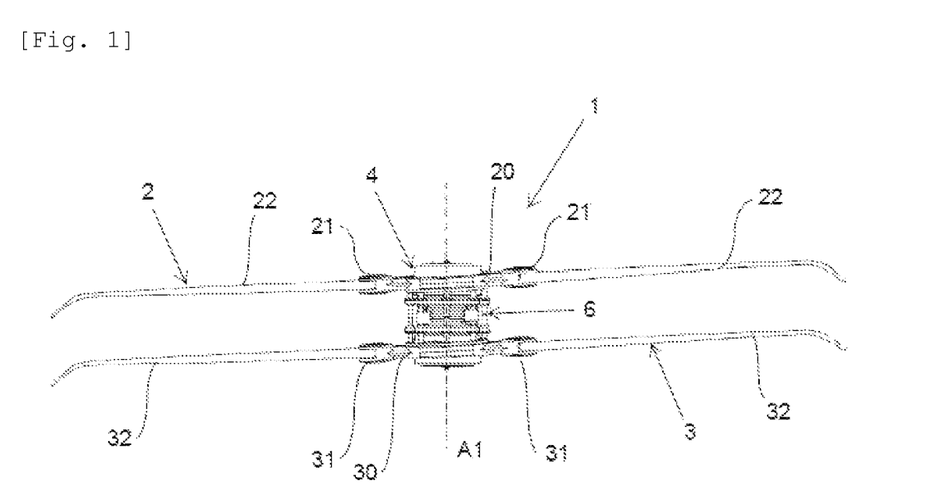
FIG. 1: overview of a propulsion device according to a particular embodiment of the present invention.
Figure 2:
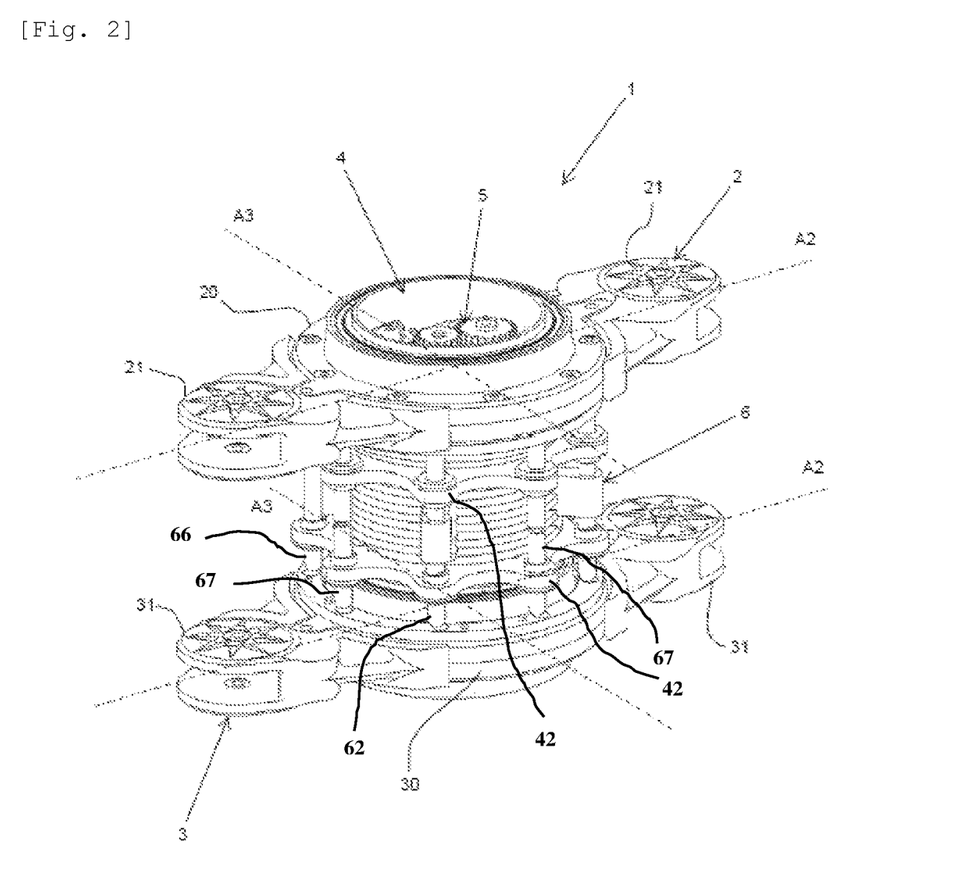
FIG. 2: perspective view of the propulsion device, with the blades omitted.

Referring first of all to FIGS. 1 and 2, it can be seen that a propulsion device 1 according to the particular embodiment includes two contra-rotating rotors 2, 3, namely an upper rotor 2 and a lower rotor 3, mounted on a hollow frame 4 incorporating all the components necessary for its autonomous operation, in particular means 5 for driving the rotors 2, 3 in rotation and means 6 for controlling the tilt of the rotors 2, 3.

The frame 4 is of generally cylindrical shape and has an upper end closed by a cap and a lower end by which the frame 4 can be secured to the airframe of an aerodyne, a generally cylindrical internal volume being defined between the said ends and the side envelope of the frame 4.

Figure 4:
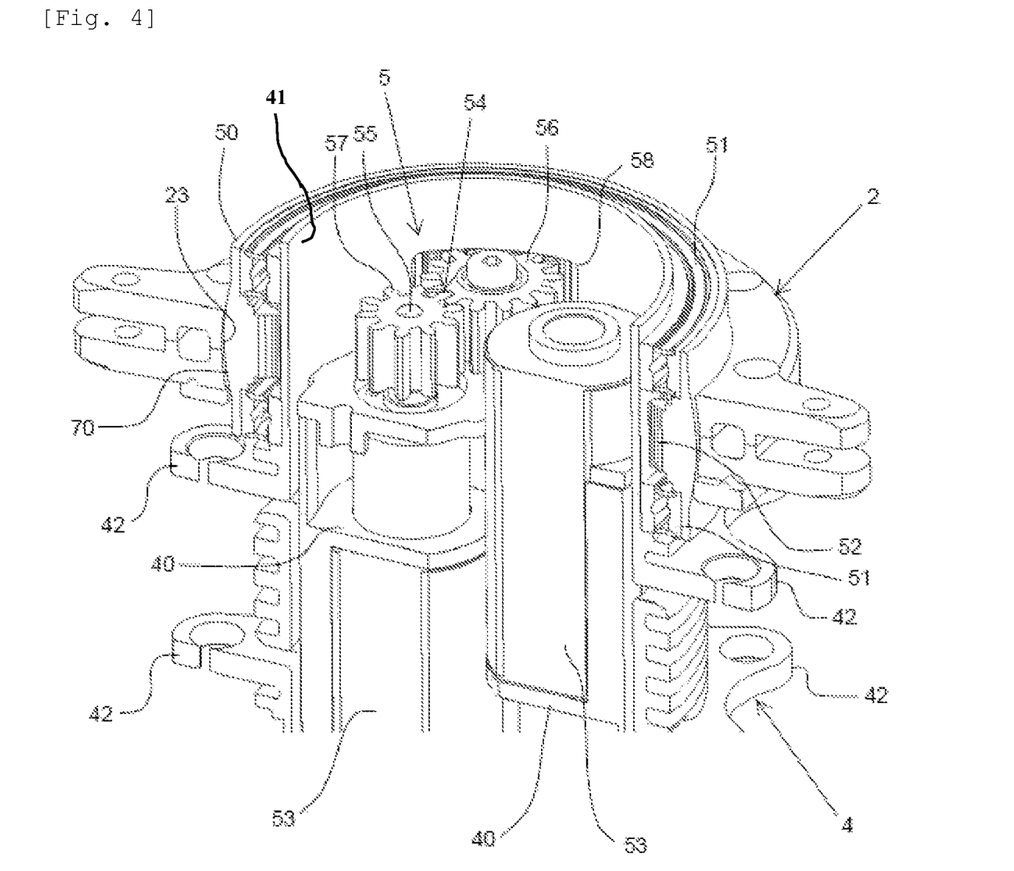
FIG. 4: perspective view, in vertical section, of an upper part of the propulsion device, with only the drive means for rotating the rotor being shown.
Figure 8:
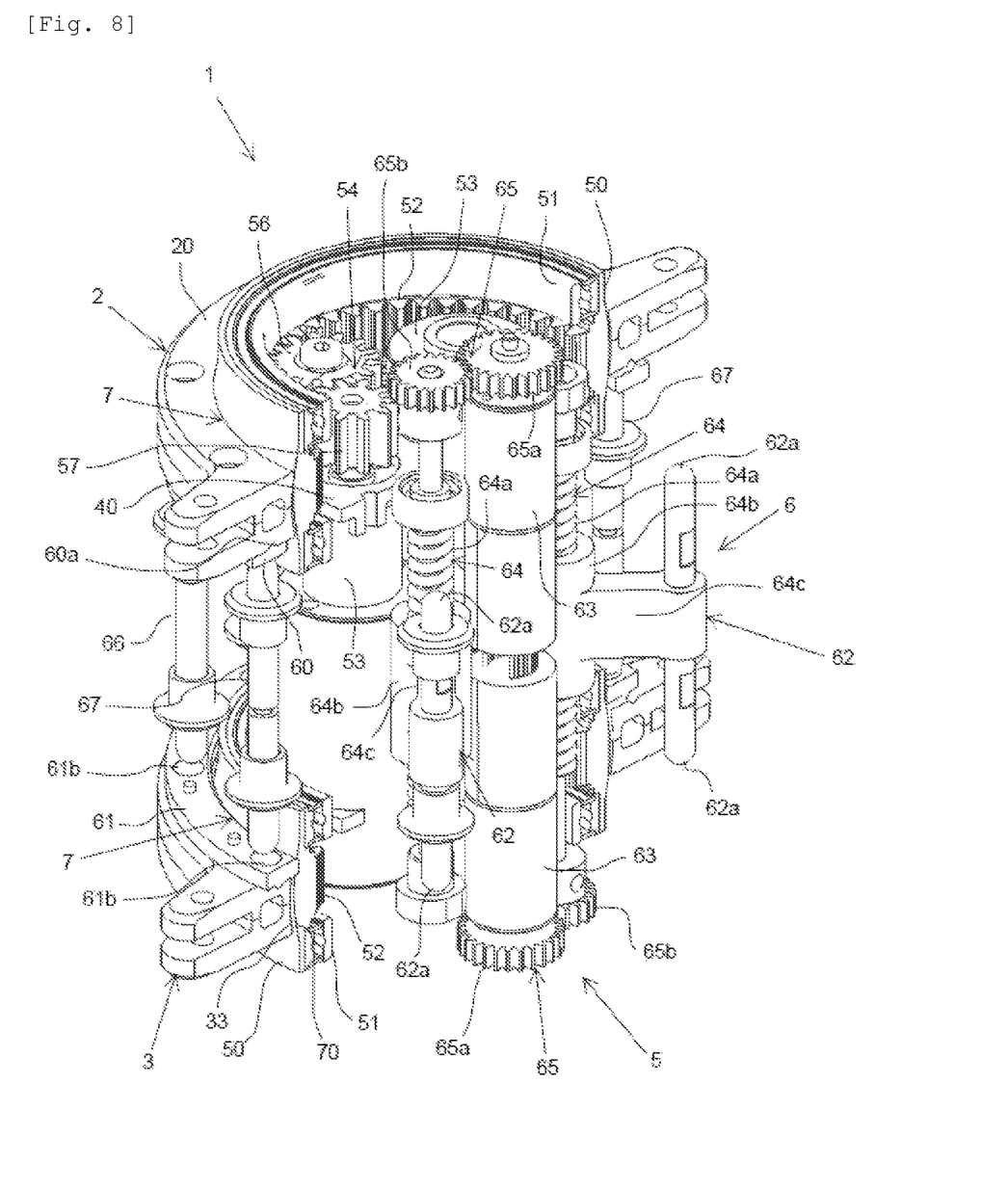
FIG. 8: schematic perspective view, in vertical section, of the propulsion device, showing both the rotational drive means and the tilt control means.
Figure 9:
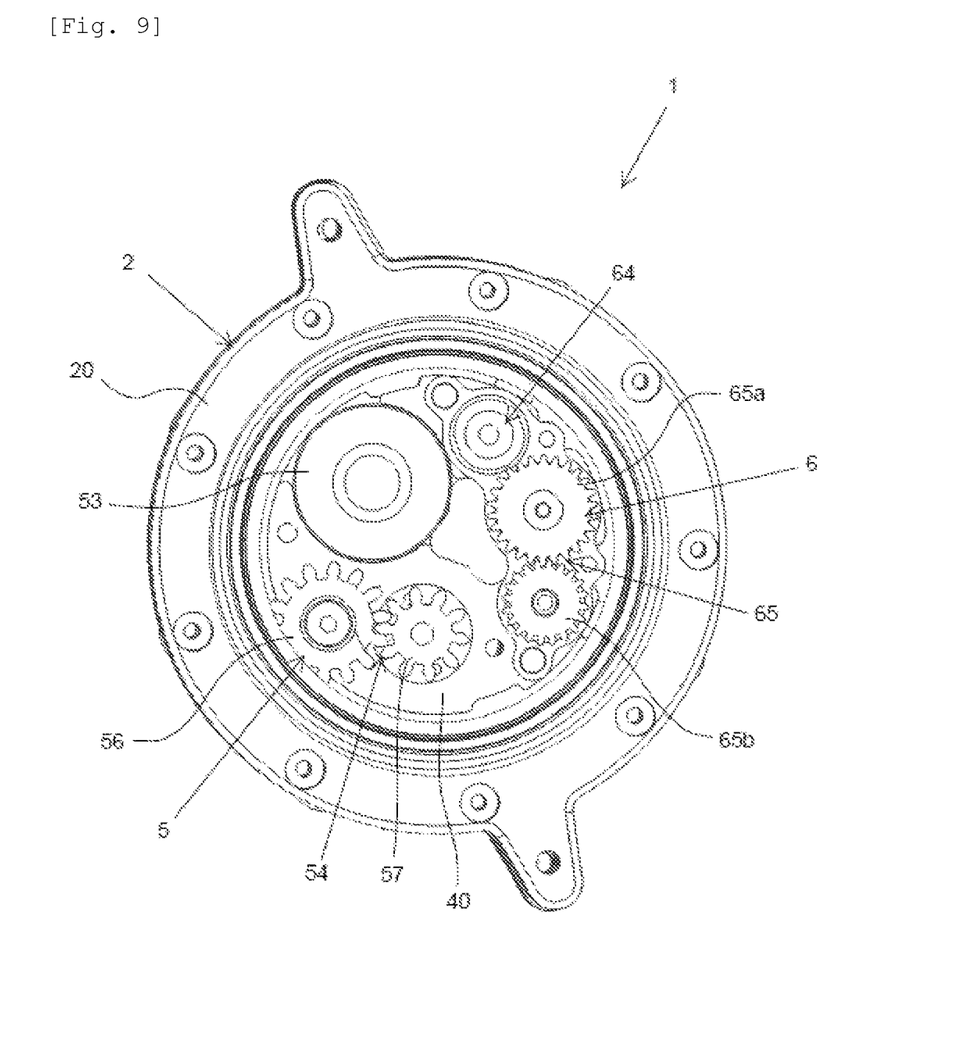
FIG. 9: schematic top view of the propulsion device.

As can be seen in FIGS. 4 and 8, supports 40 extend inwardly in the internal volume of the frame 4, to which supports 40 components forming part of the drive means 5 and the tilt control means 6 are attached.

Each rotor 2, 3 includes an annular central part 20, 30 which carries at its periphery legs 21, 31 for the attachment of blades 22, 32. Each blade 22, 32 is secured to the respective wing 21, 31 rigidly and with a fixed pitch. In other words, the blades 22, 32 are integrally connected to the central parts 20, 30.

In the embodiment, each rotor 2, 3 includes two blades 22, 32 arranged at 180° to each other and whose rotation describes a plane called a rotor disc. Any number of blades may of course be provided for each rotor, which nevertheless define together a rotor disc.

The upper rotor 2 and the lower rotor 3 are mounted on the frame 4 so that they can be driven in rotation about an axis of rotation perpendicular to their rotor disc, at the upper and lower end of the frame 4 respectively.

Figure 3:
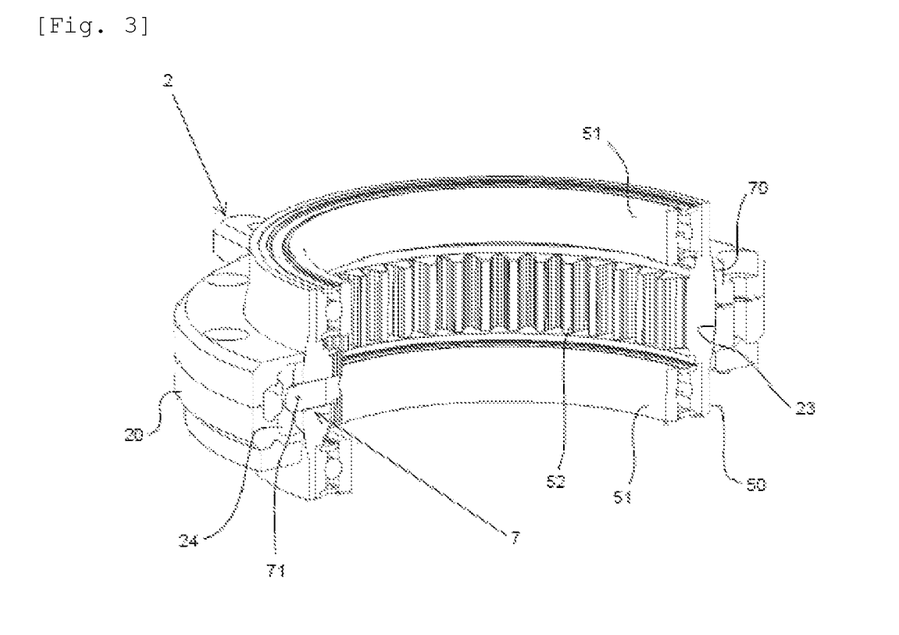
FIG. 3: perspective view, in vertical section, of a part of the upper rotor and the rotary ring.

In particular, each rotor 2, 3 is connected to the frame 4 by means of a drive ring 50 around which the rotor 2, 3 is mounted and to which it is connected by a pin spherical joint connection 7, as can be better seen in FIGS. 3 and 4.

The frame 4 has at each end a circular bearing surface 41 (FIG. 4) around which the drive ring 50 is mounted so that it can rotate about the longitudinal axis of the frame 4, which in use is coaxial with the yaw axis A1, the rotational guiding being provided by two rolling bearings 51 spaced apart from each other along the first axis.

The drive ring 50 has an outer side, the circumferential middle region of which is formed by a convex surface 70, and an inner side provided in its circumferential middle region with a circumferential toothing 52. The drive ring 50 also carries a radial pin 71 projecting from the convex surface 70.

The central annular part 20, 30 of the rotor 2, 3 has on its inner side a concave surface 23, 33 (FIG. 8 for the lower rotor 3) into which a vertical groove 24 opens to accommodate the pin 71.

The convex surface 70 and the concave surface 23, 33 are defined to be in spherical contact with each other, with the centre of the contact sphere being the intersection of the first axis (or yaw axis A1, or longitudinal axis of the frame 4) and the rotor disc. Thus, the rotor 2, 3 can rotate about second and third axes which are perpendicular to each other and both perpendicular to the first axis. Furthermore, the groove 24 has the width of the pin 71, so that once the pin 71 is engaged in the groove 24, relative rotation between the rotor 2, 3 and the drive ring 50 about the axis of rotation of the rotor 2, 3 is prevented. The height of the groove 24 is greater than the width of the pin 71, so that the pin 71 does not prevent rotation of the rotor 2, 3 about the second and third axes.

The pin spherical joint connection 7 is thus formed by the convex surface 70, the pin 71, the concave surface 23, 33 and the groove 24, and it is readily understood that it enables each rotor 2, 3 to be driven in rotation about its axis of rotation by means of the drive ring 50 and to be tilted relative to the drive ring 50.

Once secured to the aerodyne, the first axis of the propulsion device 1 is coaxial with the yaw axis A1 of the aerodyne and each of the second and third axes is coaxial with a respective one of the roll axis A2 and pitch axis A3.

The drive means 5 for driving in rotation the rotors 2, 3 will now be described with reference to FIGS. 3 and 4.

In the embodiment shown, the drive means 5 includes the two drive rings 50 and, for each of them, a drive motor 53 and a gear assembly 54.

Each motor 53 has an output shaft 55 whose rotational movement is transmitted to the drive ring 50 by the gear assembly 54.

In the embodiment shown, all of the drive means 5 is located inside the frame 4, more particularly between the two horizontal planes of the drive rings 50. Each motor 53 is a small electric motor and is carried by two supports 40 while being oriented so that its output shaft 55 is parallel to the first axis and extends toward the drive ring 50 it is intended to drive in rotation. The gear assembly 54 includes a first gearwheel 56 in mesh with the toothing 52 of the drive ring 50 and in mesh with a second gearwheel 57 mounted on the output shaft 55. In order to allow the meshing between the first gearwheel 56 and the toothing 52, a through window 58 is provided in the circular bearing surface 41, through which the teeth of the first gearwheel 56 and the toothing 52 pass. It is easy to understand that the gear assembly 54 is located at the same height as the toothing 51 which it drives in rotation.

Each motor 53 is dedicated to drive a respective rotor 2, 3 in order to provide individual control of the rotational speed of the rotors 2, 3. They can therefore be made to rotate at the same speed, or at different speeds (but always in opposite directions) for the control of the yaw attitude of the aerodyne.

Figure 5:
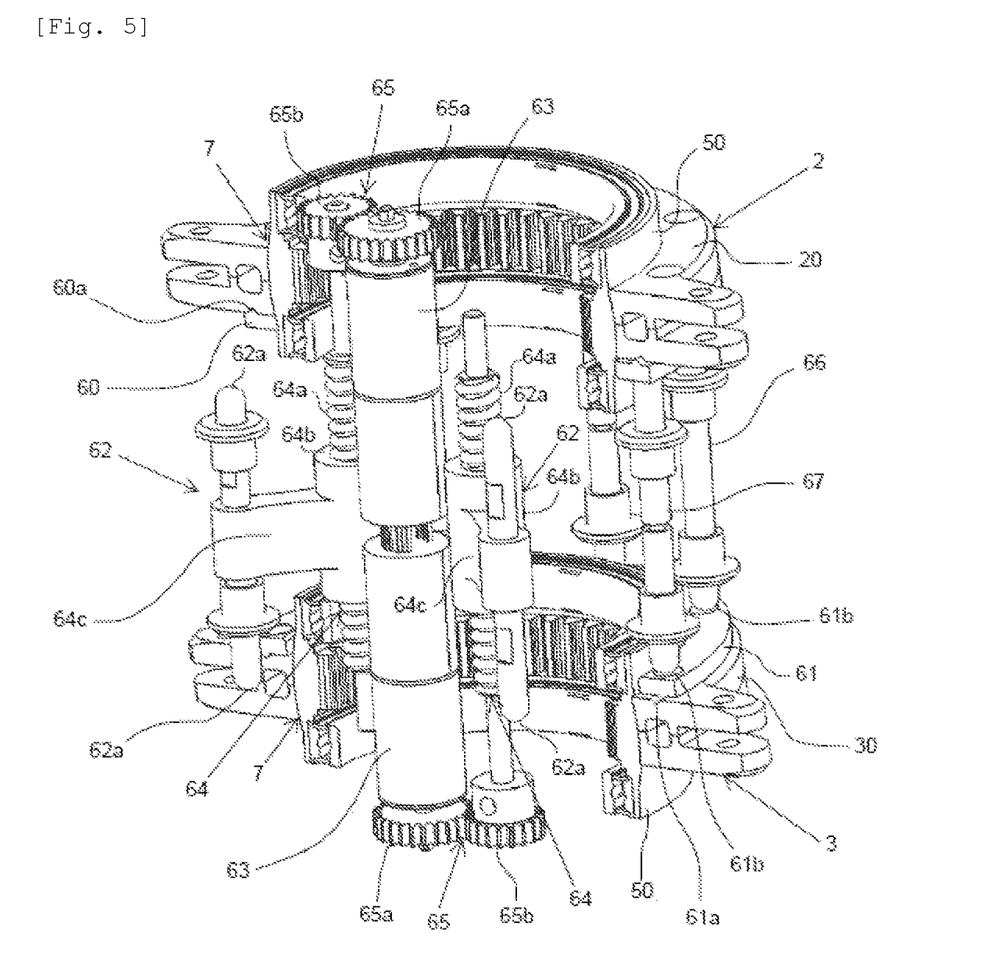
FIG. 5: perspective view, in vertical section, of the propulsion device, from an angle that shows the inside of the device, with only the means for controlling the tilt of the rotors being shown.
Figure 6:
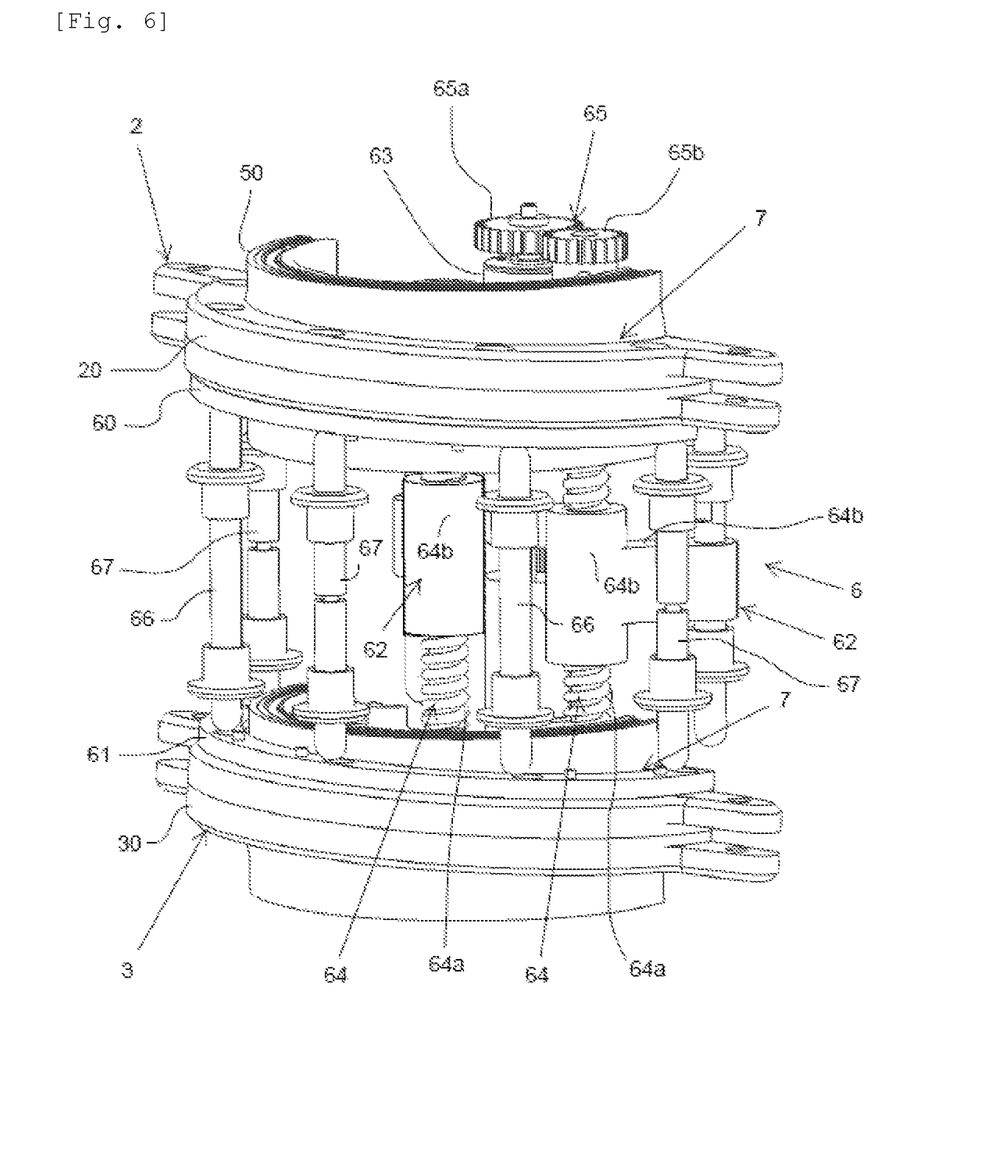
FIG. 6: view of the propulsion device of FIG. 5, from another angle showing the outside of the device.
Figure 7:
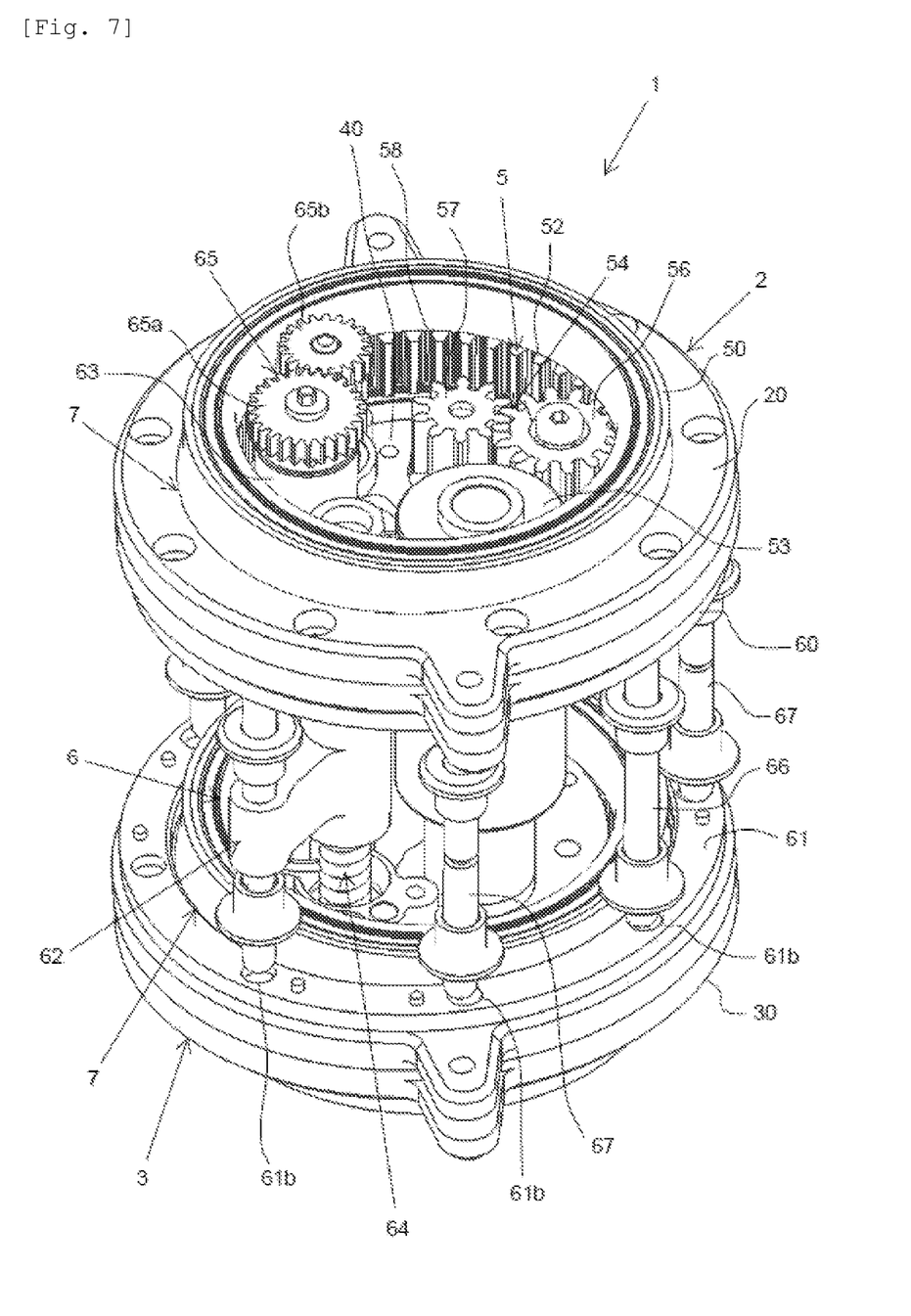
FIG. 7: schematic perspective view of the propulsion device from above, with the frame omitted.

The means 6 for controlling the tilt of the rotors 2, 3 will now be described with reference to FIGS. 5 and 6.

In the illustrated embodiment, the tilt control means 6 includes, for each rotor 2, 3, a sliding plate 60, 61, a control rod 62 for controlling the tilt of the rotor 2, 3 about the roll axis A2 and the pitch axis A3, a motor 63, a screw and nut mechanism 64, a gear assembly 65, a so-called mirror rod 66 and a plurality of wear take-up rods 67.

Each motor 63 is here a small stepper motor, thus ensuring precise control in position, located inside the frame 4, between the two horizontal planes of the drive rings 50, and is carried by a support 40 integral with the frame 4 (FIG. 8) while being oriented so that its output shaft is parallel to the first axis and extends towards the respective end of the frame 4.

Each screw and nut mechanism 64 includes a screw 64a parallel to the first axis and a nut 64b mounted on the screw 64a. The rotational movement of the output shaft of the motor 63 is transmitted to the screw 64a by a gear assembly 65 comprising a third gearwheel 65a mounted on the output shaft and in mesh with a fourth gearwheel 65b mounted at a corresponding end of the screw 64a.

Each nut 64b is secured to a control rod 62 which is located outside the frame 4, each control rod 62 being of fixed length and carried by an arm 64c extending from the respective nut 64b and passing through a slot provided for this purpose in the lateral envelope of the frame 4, the slot having its longitudinal direction parallel to the first axis A1 and dimensioned to allow translation of the arm 64c over a sufficiently large stroke so that the rotors 2, 3 can be tilted to maximum desired tilt angles.

Therefore, by controlling the motor 63 to rotate its output shaft in either direction, the nut 64c and hence the control rod 62 can be moved up or down, the distance travelled being a function of the angle of rotation of the output shaft.

Each control rod 62 has, at each of its two ends, a hemispherical surface 62a in contact with the free side of one of the sliding plates 60, 61. The control rods 62 are thus located between the sliding plates 60, 61.

Each sliding plate 60, 61 is in the form of an annular piece having an upper side and a lower side. The upper sliding plate 60 is in pivotal connection with the lower side of the central part 20 of the upper rotor 2, while the lower sliding plate 61 is in pivotal connection with the upper side of the central part 30 of the lower rotor 3. More particularly, the side of the sliding plate 60, 61 which is in contact with the central part 20, 30 of the rotor 2, 3 has an annular tongue 60a, 61a accommodated in a groove of corresponding shape and size provided in said central part 20, 30. Each sliding plate 60, 61 further carries a plurality of magnets shown schematically at 61b and only visible for the sliding plate 61, each positioned to be able to attract at least one of the rods 62, 66, 67, the latter being made, at least at their free ends, of ferromagnetic material for this purpose. The only degree of freedom of the rods 62, 66, 67 being translation in the direction parallel to the first axis, it is easily understood that rotation of each of the sliding plates 60, 61 about the axis of rotation of the respective rotor 2, 3 is prevented, the tongue 60a, 61a and the associated groove ensuring the rotational guiding of the rotor 2, 3 with respect to the respective sliding plate 60, 61. The magnets 61b carried by each sliding plate 60 or 61 cooperating with the ferromagnetic material of the rods constitute blocking means for preventing rotation of the sliding plate relative to the rotor 2 or 3.

Accordingly, by moving a control rod 62 vertically upwards or downwards, the latter can push against the upper sliding plate 60 or against the lower sliding plate 61 respectively, thereby causing the latter, and thus the rotor 2, 3 to which it is connected, to rotate about an axis of rotation that is horizontal, passes through the centre of the pin spherical joint connection 7 and is perpendicular to the straight line connecting said centre and the point of contact between the control rod 62 and the sliding plate 60, 61. The sliding plate 60, 61 against which the control rod 62 does not push is also caused to tilt in the same way, but due to the attraction between the magnet 61b and the control rod 62.

The tilt angle will be a function of the distance travelled by the control rod 62 from a neutral position in which both rotors 2 and 3 are horizontal, the distance being precisely controlled by the stepper motors 63.

The tilt of the rotors 2 and 3 means a corresponding tilt of the blades 22 and 32 about the roll axis A2 and/or the pitch axis A3, and thus control of the roll and pitch attitude and the direction of flight in the horizontal plane.

For each control rod 62, there is advantageously provided a mirror rod 66 of fixed length equal to that of the control rod 62 and diametrically opposite the latter. Each mirror rod 66 is mounted to translate freely in the direction parallel to the first axis A1, the translational guiding being provided by two lugs 42 (FIGS. 2 and 4) of the frame 4, which are external to the latter and spaced from each other along the first axis A1. The mirror rods 66 serve to balance the forces applied to the rotors 2, 3 by the control rods 62.

The rods 67 are spring-loaded wear take-up rods and are distributed angularly around the frame 4, also being carried by lugs 42 (FIG. 2). These rods 67 make it possible to ensure permanent contact at several points with the sliding plates 60, 61 in order to maintain the parallelism of the two rotors 2, 3 and the absence of clearance, even in the event of wear of the sliding plates 60, 61. Each rod 67 will advantageously have a spherical contact surface at each of its ends.

In the illustrated embodiment, two control rods 62, two mirror rods 66 and four wear take-up rods 67 are provided, evenly distributed around the circumference of the frame 4, and eight respective magnets 61b are provided for each sliding plate 60, 61, each in a position facing a respective end of a respective rod 62, 66, 67.

Alternatively, the sliding plates 60 and 61 can be made to slide not by friction but by means of ball bearings arranged between the sliding plate 60, 61 and the central part 20, 30 of the rotor concerned.

For an aerodyne of reduced mass, the magnetic blocking means are sufficient to ensure that the sliding plates 60 and 61 are blocked in rotation.

For a heavier aerodyne, it will be desirable to provide means of mechanically blocking the sliding plates.

Figure 10:
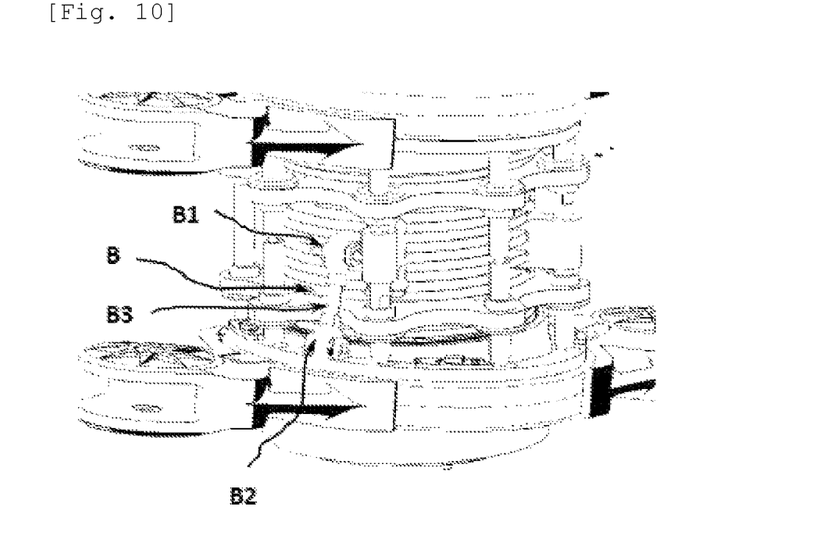
FIG. 10: view of an alternative embodiment of the means for blocking the sliding plates.

An example of such a blocking means is shown in FIG. 10.

In accordance with this embodiment, the blocking means includes at least one link B which is secured to the frame 4 by a first end at a pivot connection B1 and which is secured to a sliding plate 60 or 61 by a second end at a spherical joint connection B2. The ends of the link are connected by a sliding rod B3. Thus the link B can accompany the movements of the sliding plate 60 or 61 to which it is attached while preventing the rotation of the latter.

Control units (not shown), in particular for controlling the operation of the propulsion device 1, can be included inside the frame 4, between the two rotors 2, 3. These control units can be motor control units, a GPS antenna, inertial measurement units, etc.

It can therefore be seen that the only mass set in motion for roll and pitch attitude control is that of the two rotors 2, 3, which can be very small, so that the aerodyne is very reactive.

In addition, the centre of gravity remains stationary during roll and/or pitch movements, or is only minimally affected by them, thus avoiding the creation of instability.

The propulsion device 1 therefore offers a very high degree of manoeuvrability of the aerodyne.

Figure 11:
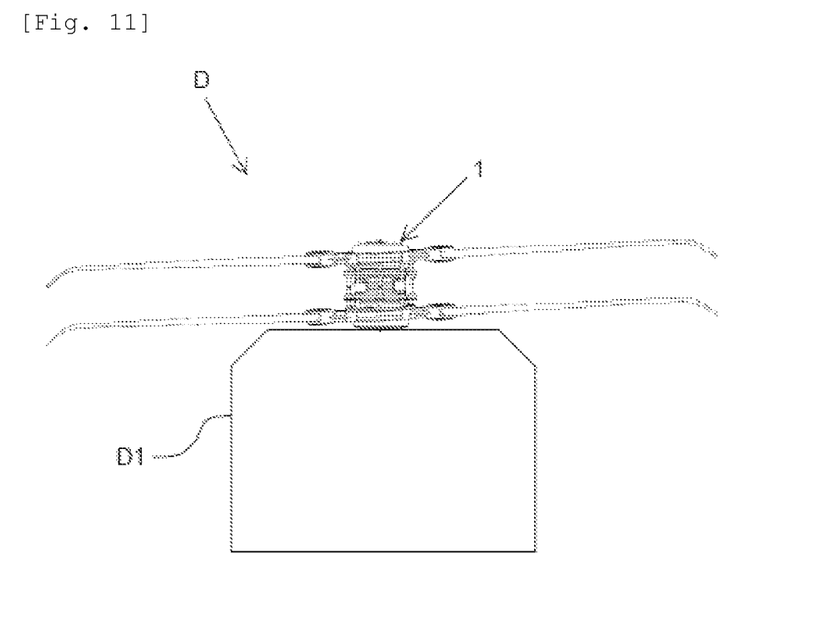
FIG. 11: schematic side view of a drone according to the present invention.

Furthermore, the propulsion device 1 is very compact, given that all the means for driving the rotors in rotation and the means for controlling the tilt of the rotors about the roll and pitch axes are located between the two rotors. Thus, as can be seen in FIG. 11, where a drone D is represented very schematically, the body D1 of which is equipped with the propulsion device 1, the total height of the drone D is not affected by the presence of the propulsion device 1. It is therefore possible to increase the size of the blades without necessarily increasing the size of the rest of the aerodyne, for both visual and acoustic stealth.

It is understood that the particular embodiment just described is indicative and non-limiting, and that modifications may be made without departing from the present invention.

Figure 12:
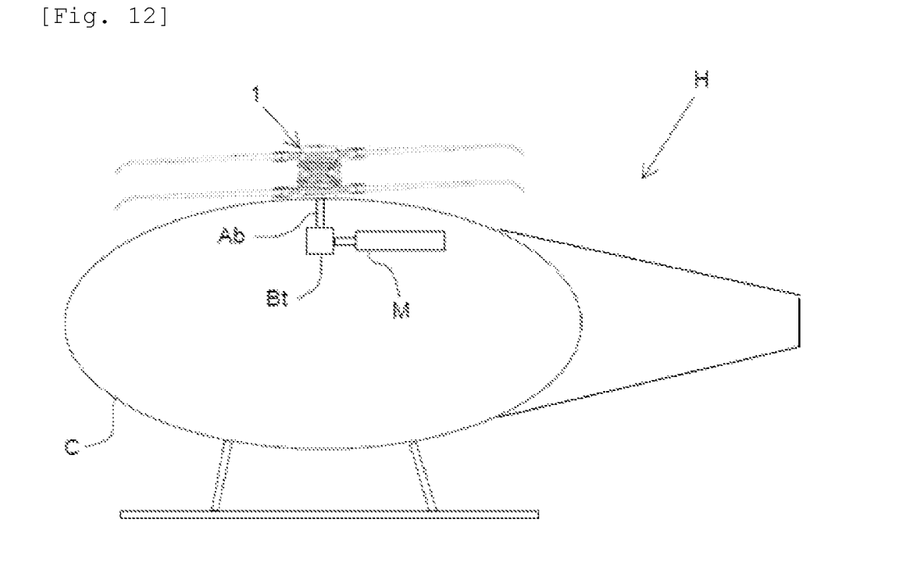
FIG. 12: schematic side view of a helicopter according to the present invention, the motor means for rotating the rotors being located partly outside the frame of the propulsion device.

For example, as illustrated very schematically in FIG. 12, it is possible that part of the motor means is located outside the frame 4 and is carried by the airframe C of the aerodyne, in particular as here in the case of a helicopter H which would require a larger motor power. In such a case, for example, the second gearwheels 57, mounted on the output shafts 55 of the motors 53 in the embodiment described above, could simply be mounted each on one end of a transmission shaft Ab parallel to the yaw axis A1 and entering the frame 4 by its lower open end, these transmission shafts Ab, of which only one is shown, being connected by any appropriate means to a dedicated engine M carried by the airframe C, such as for example through an aircraft gearbox Bt.

The propulsion device according to the present invention thus makes it possible to benefit from the advantages of known coaxial contra-rotating rotor systems for helicopters, while overcoming their disadvantages due to the presence of cyclic control systems with swashplate and pushrods, namely a high degree of complexity and detrimental vertical overall dimensions, as the helicopter cannot be housed in a hangar not specifically designed to accommodate it.

The invention claimed is:

1. A propulsion device for a vertical take-off and landing rotary-wing aerodyne, by means of coaxial contra-rotating rotors that can move in yaw, roll and pitch, the propulsion device including:
   a hollow frame having a longitudinal axis which, in use, is coaxial with the yaw axis,
   an upper rotor and a lower rotor each having an annular central part to the periphery of which fixed pitch blades are secured, the upper and lower rotors being spaced apart one above the other along the yaw axis, each of the upper and lower rotors defining a rotor disc and being adapted to be driven in rotation about an axis of rotation that is perpendicular to the rotor disc and to be tilted about the roll axis and the pitch axis,
   drive means for driving each of the upper and lower rotors in rotation about its axis of rotation, and
   tilt control means for tilting the upper and lower rotors about the roll axis and the pitch axis,
   wherein the drive means includes motor means and, for each of the upper and lower rotors, a rotary part which is adapted to be driven in rotation about the yaw axis by the motor means, each rotary part being located in the central opening of the respective one of the upper and lower rotors and being connected to said respective rotor by a pin spherical joint connection, the centre of which is the intersection of the respective rotor disc and the yaw axis and the axis of which is the axis of rotation of the respective rotor.

2. The propulsion device according to claim 1, wherein the motor means includes at least one motor located outside the frame and adapted to produce an output motion, and transmission means for transmitting the output motion of the at least one motor to the rotary parts to drive the rotary parts in rotation, at least part of said transmission means being located inside the frame.

3. The propulsion device according to claim 1, wherein the motor means includes, for each of the upper and lower rotors, a dedicated motor that is dedicated to the respective rotor and having an output shaft parallel to the yaw axis and whose rotational movement is transmitted to the drive member.

4. The propulsion device according to claim 1, wherein the motor means for the upper and lower rotors is located inside the frame, between the rotary parts.

5. The propulsion device according to claim 4, wherein the motor means includes two dedicated motors aligned with each other, the output shaft of one dedicated motor being located on the upper rotor side while the output shaft of the other dedicated motor being located on the lower rotor side, both dedicated motors extending along an inner wall of a side envelope of the frame.

6. The propulsion device according to claim 1, wherein the rotary parts are each formed by a drive ring rotatably mounted on a circular bearing surface of the frame in which is provided at least one window through which extends a drive member adapted to be driven in rotation by the motor means and adapted to drive the drive ring in rotation.

7. The propulsion device according to claim 6, wherein each of the upper and lower rotors is in spherical contact with the respective drive ring, the centre of the contact sphere being the intersection of the yaw axis and the rotor disc of the respective rotor, and there being provided a groove which opens on the inner surface of the central part of the respective rotor and has a length parallel to the yaw axis, in which groove a radial pin secured to the drive ring is engaged so as to transmit to the respective rotor the rotational movement of the drive ring about the yaw axis while allowing rotations of the respective rotor about the roll axis and the pitch axis.

8. The propulsion device according to claim 6, wherein each drive ring is provided, on an inner surface thereof, with a circumferential toothing and the respective drive member is a first gearwheel in mesh with the toothing.

9. The propulsion device according to claim 1, wherein the tilt control means includes at least two control rods, of fixed length, located outside the frame, between the upper and lower rotors, and movable in translation parallel to the yaw axis, in both directions, so that each is able to push with one end thereof against one rotor of the upper and lower rotors and thus to rotate said rotor about an axis, the control rods being angularly spaced from each other so that said axes are different, the tilt control means further including additional motor means for translating each of the rods.

10. The propulsion device according to claim 9, wherein the motor means for the upper and lower rotors is located inside the frame, between the rotary parts, and all the additional motor means are located between the rotary parts.

11. The propulsion device according to claim 9, wherein the additional motor means includes, for each control rod, an additional dedicated bidirectional motor whose output shaft rotates a screw parallel to the yaw axis and on which is mounted a rotationally locked nut, so that rotation of the screw moves the nut along the screw, the nut carrying an arm which extends out of the frame, passing through a slot parallel to the yaw axis, and to which the control rod is secured.

12. The propulsion device according to claim 11, wherein the motor means for the upper and lower rotors is located inside the frame, between the rotary parts, and all the additional motor means are located between the rotary parts, wherein the motor means includes two dedicated motors aligned with each other, the output shaft of one dedicated motor being located on the upper rotor side while the output shaft of the other dedicated motor being located on the lower rotor side, both dedicated motors extending along an inner wall of the a side envelope of the frame, and wherein the additional dedicated bidirectional motors that are dedicated to the tilt control are aligned with each other and arranged laterally to said dedicated motors, which are dedicated to driving the rotary parts, wherein an output shaft of one additional dedicated bidirectional motor is located on the upper rotor side and an output shaft of the other additional dedicated bidirectional motor is located on the lower rotor side, the screws extending next to the plurality of dedicated motors and additional dedicated bidirectional motors and along the inner wall of the side envelope of the frame.

13. The propulsion device according to claim 9, wherein for each control rod there is provided a mirror rod of fixed length, located outside the frame, between the upper and lower rotors, which is parallel to and diametrically opposite the respective control rod and movable in translation parallel to the yaw axis in both directions, and each of the two ends of every mirror rod is in contact with a respective rotor.

14. The propulsion device according to claim 13, wherein the propulsion device also includes spring-loaded wear take-up rods located outside the frame, between the upper and lower rotors, and movable in translation parallel to the yaw axis, in both directions, and each of two ends of every wear take-up rod is in contact with the respective sliding plate by resilient bias, the control rods and the wear take-up rods being regularly distributed around the frame and all at the same distance from the yaw axis.

15. The propulsion device according to claim 9, wherein the propulsion device includes two control rods, at least two ends of each of the control rods being in spherical contact with a sliding plate which is provided on the central part of the side of each of the upper and lower rotors facing the other rotor, the sliding plate being mounted in a manner allowing relative rotation between the sliding plate and the respective rotor about the axis of rotation of the respective rotor, blocking means being provided to prevent rotation of the sliding plate relative to the rods.

16. The propulsion device according to claim 15, wherein the blocking means includes magnets, carried by one of the rods the sliding plate, which magnets cooperate with a ferromagnetic material respectively carried by or forming the other of rods and the sliding plate, such that rotation of the sliding plate about the axis of rotation is prevented by an attractive force between the control rods and the sliding plate resulting from the cooperation of said magnets and said ferromagnetic parts.

17. The propulsion device according to claim 15, wherein the blocking means includes at least one link secured to the frame by a first end at a pivot connection and secured to a sliding plate by a second end at a spherical joint connection, the first and second ends of each of the at least one link being connected by a sliding rod, the at least one link thus accompanying movements of the sliding plate while preventing rotation of the sliding plate.

18. The propulsion device according to claim 15, wherein each sliding plate is connected to the central part of the respective rotor by a rolling bearing.

19. A vertical take-off and landing rotary-wing aerodyne, including a propulsion device as defined in claim 1.

* * * * *